UNITED STATES PATENT OFFICE.

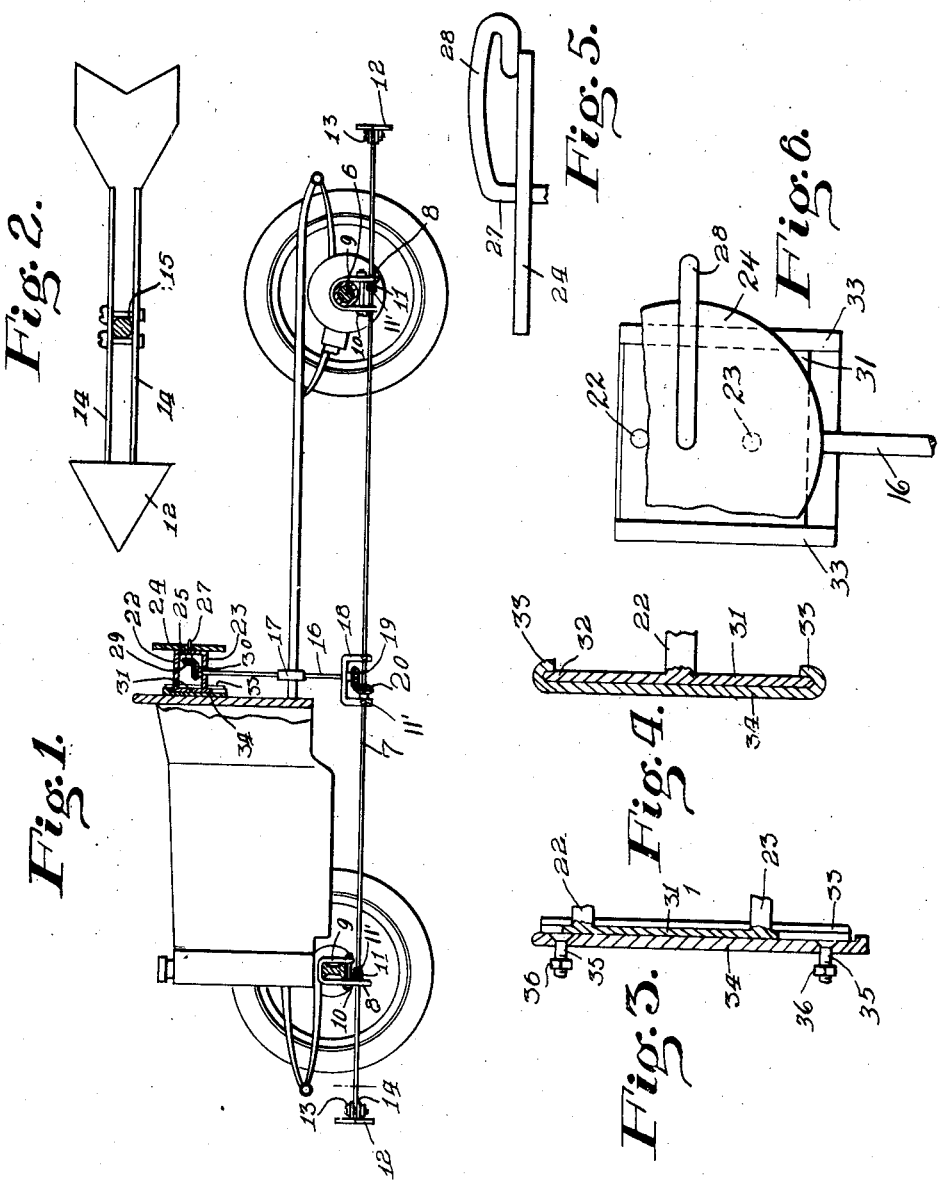

WALTER CLAIR SENNETT, OF PORTLAND, MAINE.

AUTOMOBILE-SIGNAL.

1,344,152.                Specification of Letters Patent.    Patented June 22, 1920.

Application filed December 15, 1919. Serial No. 344,898.

*To all whom it may concern:*

Be it known that I, WALTER C. SENNETT, a citizen of the United States, residing at Portland, in the county of Cumberland and State of Maine, have invented a new and useful Automobile-Signal, of which the following is a specification.

This invention relates to automobile signals, and it is the primary object of the invention to provide a novel signal which will operate to display a signal at the front and rear of an automobile, to which the same is applied, simultaneously upon the manipulation of a single lever.

A further object of the invention is to provide a device of this character which will be operated and controlled by a lever positioned on the dash of the automobile, the same including a novel compensating bracket by which the chassis of the automobile is permitted to move relatively to the axle thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:—

Figure 1 illustrates an automobile chassis having a signaling device constructed in accordance with the present invention applied thereto;

Fig. 2 is a detail view of one of the indicators;

Fig. 3 is a longitudinal sectional view through the bracket;

Fig. 4 is a transverse sectional view through the bracket;

Fig. 5 is a fragmental detail view of the operating handle; and

Fig. 6 is a plan view of the dial and operating handle.

Referring to the drawing in detail, the reference character 5 designates the front axle of an automobile, and the reference numeral 6 designates the rear axle thereof, the same being supported in operative relation with the chassis of the automobile, by means of the usual spring construction.

The device forming the subject matter of the present invention includes the relatively long supporting rod 7 which is of a length greater than the length of the wheel basis of the automobile to which the device is applied, and as shown the supporting rod 7 extends through suitable openings formed in the brackets 8, each of which includes a pair of spaced arms 9 apertured to receive the securing bolt 10 whereby the brackets are secured to the axles of the automobile against displacement.

Adjustable collars 11 are supported on the rod 7 adjacent the respective brackets by means of the set screws 11′ so that movement of the supporting rod 7 with relation to the axles, and longitudinally of the chassis of the automobile is prevented, but at the same time this connection permits of a free rotary motion of the supporting rod 7 to cause the operation of the indicating signals to be hereinafter more fully described.

On each end of the supporting rod 7 is an indicator 12 which in the present invention is in the form of an arrow secured to the ends of the supporting rod 7 by means of the bolts 13 passing through suitable openings in the opposed side walls 14 of the arrows, there being an opening 15 for accommodating the ends of the rod 7 associated with the arrows.

The controlling mechanism includes an operating rod 16 which is preferably separable, the adjacent ends thereof being connected by the collar 17, and as shown, one end of the rod 16 extends through the substantially U-shaped bracket 18, and accommodates the beveled gear 19, which is secured thereto so that movement of the operating rod 16 causes a relative movement of the beveled gear 19.

A beveled gear 20 is in mesh with the beveled gear 19 the same being shown as secured to the supporting rod 7 so that movement of the beveled gear 19 transmits rotary movement to the beveled gear 20 with the result that the supporting rod 7 is rotated to cause the arrows, or indicators supported on the ends of the rod 7 to move in a predetermined manner.

An upper bracket includes the opposed side arms 22 and 23 and a circular plate 24 secured to the relatively straight arm 25 of the bracket, the arm 25 being provided with an opening for receiving the controlling lever 27, one end of which is formed into a handle 28 the opposite end thereof supporting the beveled pinion 29.

Mounted to operate with the operating rod 16, is a beveled pinion 30, which is in mesh with the beveled pinion 29 to cause rotary movement of the operating rod upon movement of the operating lever, to cause a relative movement of the indicators as heretofore described.

Rigidly secured to the ends of the side arms 22 and 23 is the plate 31 having its side edges positioned under the inturned flanges 33 of the relatively long supporting plate 34, which is rigidly secured to the dashboard of an automobile, by means of the bolts 35, passing through suitable openings in the dash which are secured against displacement by means of the nuts 36.

When the device is installed on an automobile, the operating rod 16 is extended through the flooring boards of the automobile to which the device is to be attached, the supporting plate 34 is secured to the dash board of the automobile and the plate 31 slid into position. It will thus be seen that movement of the chassis with relation to the axles of the automobile is compensated for by movement of the plate 31 sliding on the relatively long supporting plate 34.

If it becomes necessary to cause the operation of the indicators supported on the ends of the supporting rod 7 it is only necessary to move the operating handle 28 to a predetermined position to cause the indicators to move to the right or left, thus indicating the direction to be taken by the automobile supplied with the signaling device.

Having thus described the invention, what is claimed is:—

1. In an automobile signaling device, a supporting rod, brackets for supporting the supporting rod, indicators secured to the respective ends of the supporting rod, a bracket embracing a portion of the supporting rod, an operating rod having one of its extremities operating in the last mentioned bracket, means disposed adjacent the upper end of the operating rod for causing rotation of the operating rod and the supporting rod, a compensating bracket having connection with one end of the operating rod, said compensating bracket adapted to permit movement of the body of the automobile to which the device is applied with relation to the operating rod.

2. In combination with an automobile and the spring supported chassis thereof, a signaling device including a supporting rod having indicating members supported on the respective ends thereof, operating means having connection with the supporting rod for causing the rotation thereof, a compensating bracket including a relatively long plate having flanges, and means carried by the operating means and coöperating with the flanges for permitting movement of the chassis with relation to the signaling device.

In testimony that I claim the foregoing as my own I have hereto affixed my signature in the presence of two witnesses.

WALTER CLAIR SENNETT.

Witnesses:
    FRANK H. HASKELL,
    DORA H. CORLISS.